United States Patent [19]

Parsons et al.

[11] Patent Number: 5,046,923

[45] Date of Patent: Sep. 10, 1991

[54] HELICOPTER AUTOROTATION DETECTION AND RECOVERY

[75] Inventors: Douglas A. Parsons, Enfield; Mark A. Johnston, Windsor, both of Conn.

[73] Assignee: United Technologies Corporation, Hartford, Conn.

[21] Appl. No.: 416,176

[22] Filed: Oct. 2, 1989

[51] Int. Cl.$^5$ .................... F01B 25/00; F16D 23/00; B60K 41/00

[52] U.S. Cl. .................... 416/30; 60/39.281; 192/0.084; 192/0.096

[58] Field of Search .................... 416/25, 26, 27, 30; 192/0.084, 0.096, 0.033; 60/39, 281

[56] References Cited

U.S. PATENT DOCUMENTS

| | | | |
|---|---|---|---|
| 3,034,583 | 5/1962 | Best | 60/39.281 |
| 3,357,177 | 12/1967 | Cornett | 60/39.281 |
| 4,036,164 | 7/1977 | Kowach et al. | 416/30 |
| 4,217,754 | 8/1980 | Schmidt-Roedenbeck et al. | 60/39.281 |
| 4,276,744 | 7/1981 | Pisano | 60/39.16 R |
| 4,307,451 | 12/1981 | Zagranski et al. | 60/39.281 |
| 4,411,595 | 10/1983 | Pisano | 416/1 |
| 4,449,360 | 5/1984 | Evans | 60/39.281 |
| 4,453,378 | 6/1984 | Zagkanski et al. | 60/39.281 |
| 4,466,526 | 8/1984 | Howlett et al. | 192/0.096 |
| 4,772,180 | 9/1988 | Walker et al. | 416/25 |

Primary Examiner—Edward K. Look
Assistant Examiner—Hoang Nguyen
Attorney, Agent, or Firm—Richard H. Kosakowski

[57] ABSTRACT

The existence of autorotation of a load (e.g., a helicopter rotor system) coupled to the free turbine of a gas turbine engine is determined and a signal indicative thereof enables an integrator which, upon autorotation, integrates rate-based recovery anticipation provided thereto, the integrator output providing a time-composite bias signal to the main control portion of the engine fuel control to increase the speed of the gas generator of the engine in anticipation of rotor reengagement with the free turbine. The amount of recovery error is determined from the rotor speed error and is multiplied with the integrator output, the product being fed, upon completion of autorotation recovery, to the integrator input whose output now provides a controlled removal of the bias signal from the main control portion so as to minimize transients induced therein.

17 Claims, 2 Drawing Sheets

HELICOPTER AUTOROTATION DETECTION AND RECOVERY

DESCRIPTION

1. Technical Field

This invention relates to helicopters, and more particularly to the detection of rotor autorotation and the use of integration techniques to provide time-based autorotation recovery anticipation to the main control portion of a helicopter engine control.

2. Background Art

In modern helicopters, the use of main rotor systems having lower inertia reduces the level of stored energy in the rotor system and causes the rotor to be more susceptible to large transient speed excursions during some flight maneuvers. In a quick turn, for example, airspeed kinetic energy is transferred into rotor torque to maintain or increase rotor speed. An autorotative state is reached in which rotor speed exceeds engine speed and the rotor is declutched from the engine. During recovery, the rotor has used up a substantial portion of the kinetic energy while rotor decelerating torque builds rapidly, slowing the rotor from its autorotative level. At clutch reengagement, substantial engine torque is required to maintain sufficient rotor speed.

Typically, modern helicopter fuel controls provide for autorotation detection and recovery to mitigate engine droop and adverse stabilization effects on the craft resulting from the torque reaction imposed by the engine on the airframe upon rotor reengagement. In Howlett et al. U.S. Pat. No. 4,466,526 the rate of change of main rotor speed is used by the fuel control to increase the engine speed in anticipation of rotor reengagement.

However, the recovery from autorotation may occur at various rates requiring different degrees of anticipation to the main control portion of the engine fuel control. A helicopter fuel control containing the inventive concepts of Howlett et al. provides for increased fuel flow as a function of the instantaneous state of the rotor system. However, controlling to the instantaneous state provides for a slower than desired engine response.

Also, any anticipation applied to the main control portion requires a form of controlled removal to prevent secondary transients from being induced into the control system output.

DISCLOSURE OF INVENTION

Objects of the present invention include provision of a helicopter engine fuel control which supplies integrated rate-based autotoration recovery anticipation to the main control portion of the fuel control and which provides for controlled removal of the anticipation so as to prevent secondary transients from being induced therein.

According to the present invention, the existence of autorotation of a load coupled to the free turbine of a gas turbine engine is determined and a signal indicative thereof enables an integrator which, upon autorotation, integrates rate-based recovery anticipation provided thereto, the integrator output providing a time-composite bias signal to the main control portion of the engine fuel control to increase the speed of the gas generator of the engine in anticipation of reengagement of the load with the free turbine.

In further accord with the present invention, the amount of autorotation recovery error is determined as a function of the sensed rotor speed and desired free turbine speed and is multiplied with the integrator output, the product being fed, upon completion of autorotation recovery, to the integrator input whose output is proportional to the recovery error, thus effectuating a controlled removal of the bias signal from the main control portion which reduces transients induced therein.

The present invention has utility in rotorcraft by providing for the controlled build-up and removal of a time-composite of different degrees of rotor reengagement anticipation to the main control portion of the fuel control. The invention may be implemented in a fuel control by means of dedicated digital and/or analog hardware, or may be implemented in a suitable computer by means of relatively simple program steps, utilizing only apparatus and techniques which are readily available and well known in the art, in light of the teachings which follow hereinafter.

These and other objects, features and advantages of the present invention will become more apparent in light of the detailed description of a best mode embodiment thereof, as illustrated in the accompanying drawing.

BRIEF DESCRIPTION OF DRAWING

The sole FIGURE herein is a simplified schematic block diagram of a helicopter rotor drive system including a free turbine gas engine and a fuel control containing the logic components of the present invention.

BEST MODE FOR CARRYING OUT THE INVENTION

Figure 1A:
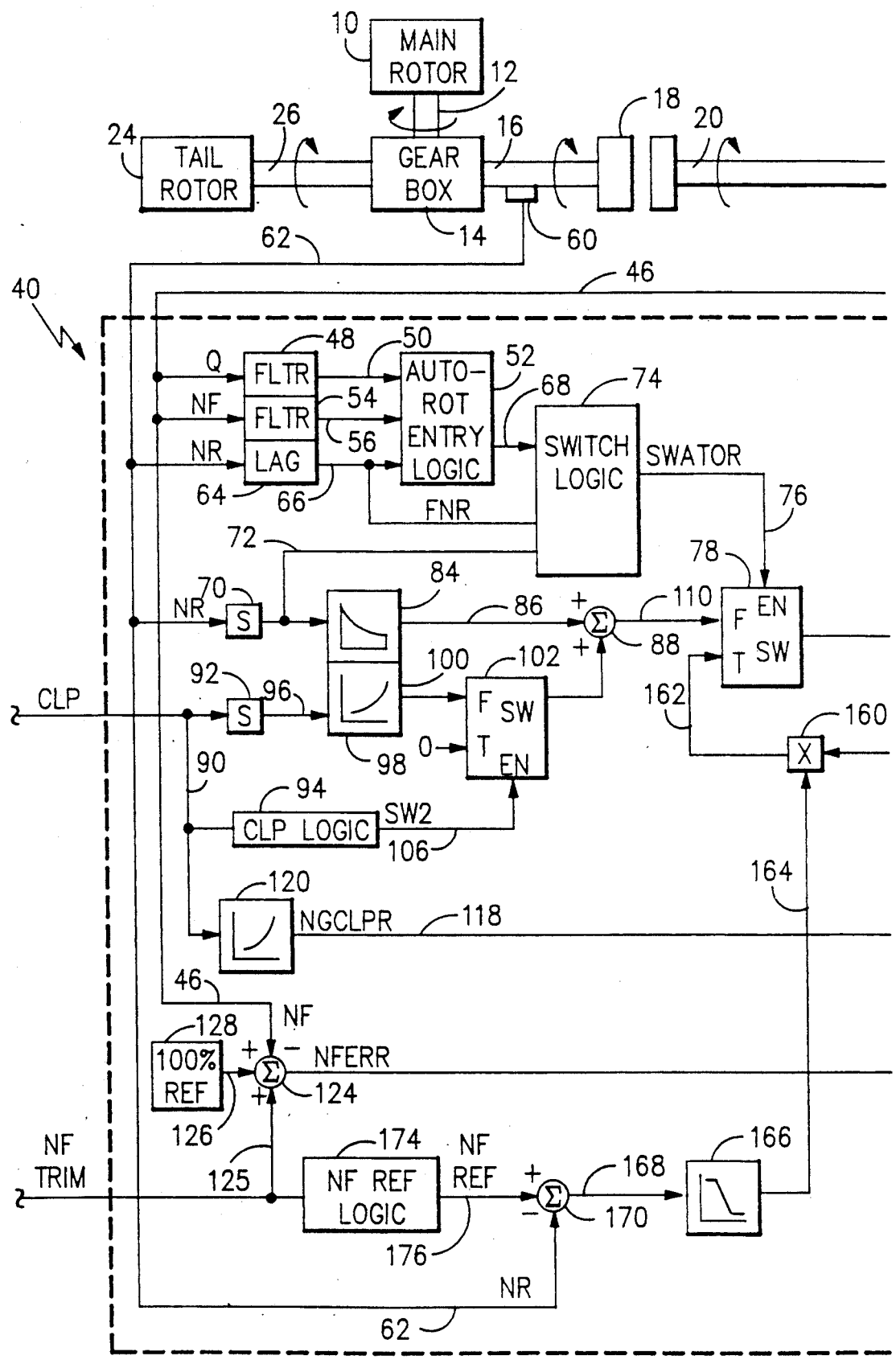
Figures 1, 1B:
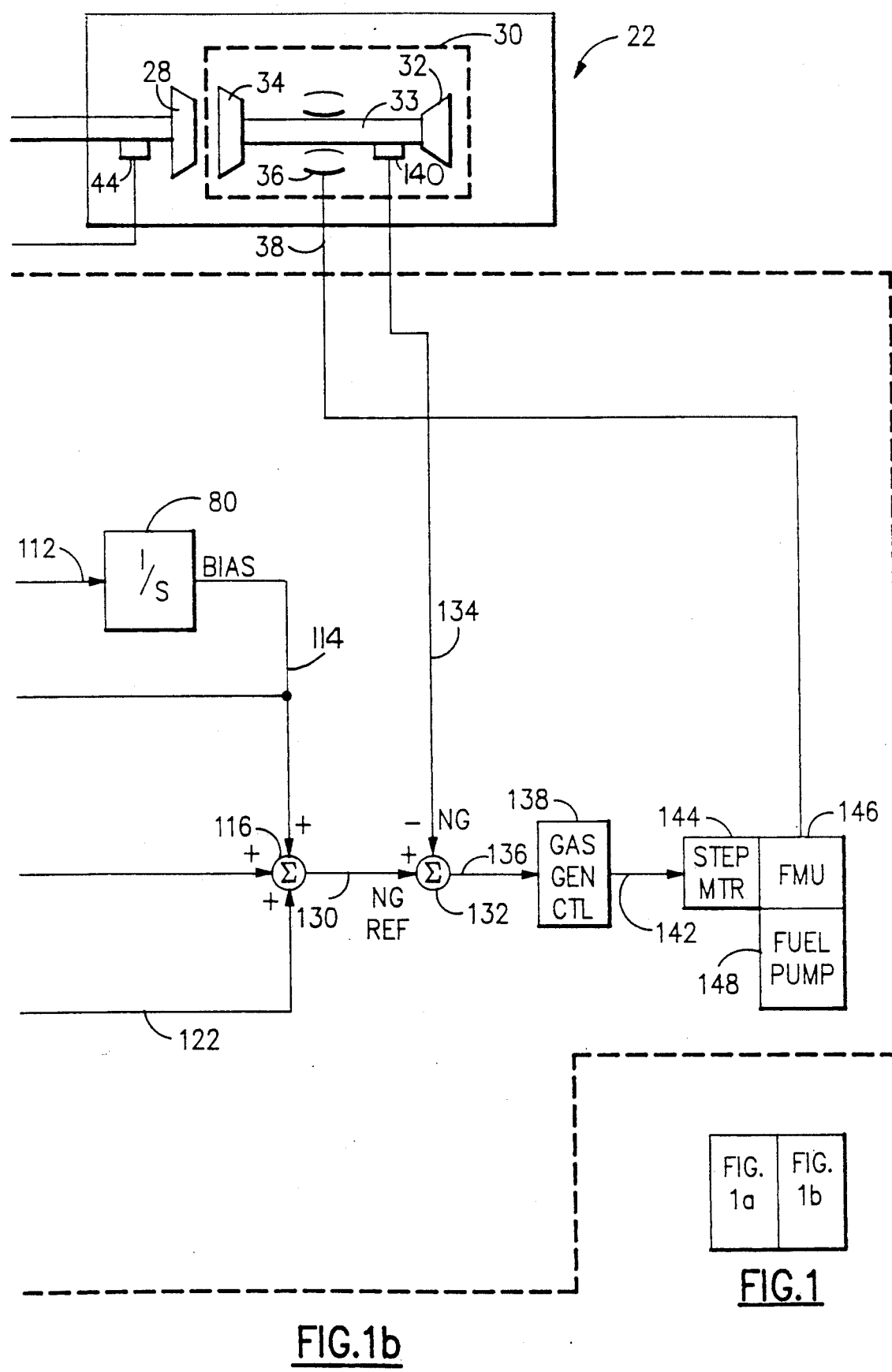

Referring to FIG. 1, a main rotor 10 of a helicopter connects through a shaft 12 to a gear box 14 which is driven by a shaft 16 through a clutch 18. The clutch 18 engages an output shaft 20 of an engine 22 when the engine speed equals or exceeds the rotor speed. The gear box 14 drives a tail rotor 24 through a shaft 26 such that the main rotor 10 and tail rotor 24 are driven at speeds at a fixed relationship to one another.

The engine 22 may typically comprise a free turbine gas engine, such as the Model PW205B manufactured by Pratt & Whitney Canada. The engine output shaft 20 is driven by a free turbine 28, which in turn is driven by gases from a gas generator 30 having a compressor 32 connected by a shaft 33 to a turbine 34, and a burner section 36 to which fuel is applied by fuel lines 38 under the control of a fuel control 40. The fuel control 40 provides the correct fuel flow in the fuel lines 38 to maintain a desired free turbine speed (NF).

A combination free turbine speed (NF) and torque (Q) sensor 44 is disposed near the gearing between the gas generator 30 and output shaft 20. The magnetic pickup-type sensor 44, which comprises in part a torque shaft comprising two concentric shafts affixed at a single end, measures the offset between the reference outer shaft and the load bearing inner shaft as a gear on each shaft passes by the sensor. The Q/NF sensor provides a torque signal (Q) on one of the lines 46 to a notch filter 48 which attenuates frequencies at and around the resonant frequency of the helicopter rotor system. The filter output signal (QLFLT) is provided on a line 50 to autorotation entry logic 52 (AEL), described in detail hereinafter. The Q/NF sensor also provides an NF signal on one of the lines 46 to a similar notch filter 54, whose output signal (NFFLT) is presented on a line 56 to the AEL 52.

A rotor speed (NR) sensor 60, e.g., a tachometer, is disposed near the shaft 16 and provides an NR signal on a line 62 to a low-pass (lag) filter 64, whose output (FNR) is provided on a line 66 to the AEL. The AEL determines an autorotative state upon a predetermined difference between the rotor speed and free turbine speed accompanied by an unloading of torque on the engine. The AEL provides a signal (SWATOE) indicative thereof on a signal line 68. Autorotation is over when the shaft 16 and free turbine shaft 20 have reclutched.

The AEL implements the following equations:

$$\text{IF } FNR-NFFLT>ASPLIT \text{ AND}$$
$$QLFLT<AQLMX \text{ FOR}>ATIME1, \text{ THEN}$$
$$SWATOE=1 \quad (1)$$

$$\text{IF } FNR-NFFLT<ACOUPL \text{ FOR } ATIME2,$$
$$\text{THEN } SWATOE=0 \quad (2)$$

where:
FNR, NFFLT, QLFLT are AEL inputs;
ASPLIT is a predetermined limit value in percent for the difference between the sensed NR and NF values;
AQLMX is a limit value of Q for autorotation sensing;
ATIME1 is a minimum sustained autorotation sense time;
ACOUPL is a coupled rotor sense value;
ATIME2 is a minimum coupled rotor sense time; and
SWATOE is the boolean variable output of the AEL indicative of sensed autorotation entry (entry when SWATOE=1).

NR is also provided to a derivative circuit 70 which provides an NR rate of change signal (DNRFB) on a line 72 to switch logic 74 described hereinafter. Also provided to the switch logic 74 is the filtered NR signal line 66 and the SWATOE signal line 68. The switch logic provides a signal (SWATOR) on a line 76 that controls a switch 78 that, in turn, controls the input signal provided to an integrator 80, the operation of which is described in detail hereinafter. The switch logic implements the following equations:

$$\text{IF } SWATOE=1 \text{ AND } FNR<ANR, \text{ THEN}$$
$$SWATOR=0 \quad (3)$$

$$\text{IF } DNRFB>ADNR \text{ FOR } ATIME3, \text{ THEN}$$
$$SWATOR=1 \quad (4)$$

where:
FNR, DNRFB, SWATOE are switch logic inputs;
ANR is a maximum NR value at which recovery is enabled;
ADNR is a rotor rate value at which autorecovery is disabled;
ATIME3 is a minimum coupled rotor sense time; and
SWATOR is the boolean variable switch logic signal output which controls the first switch.

The NR rate of change signal (DNRFB) is also provided to a schedule 84 of autorotation recovery NG rate request versus decaying NR rate of change. The schedule output signal on a line 86 is indicative of NG rate request in % NG/SEC and is provided to a summing junction 88.

A collective lever pitch (CLP) signal on a line 90 originates from the pilot and is provided to both a derivative circuit 92 and CLP logic 94. CLP is indicative of collective pitch stick angle. The derivative circuit 92 provides a signal indicative of CLP rate of change on a line 96 to a schedule 98 of autorotation recovery NG rate request versus CLP rate of change. The schedule output on a line 100 is indicative of NG rate request and is provided to a false (F) input of a switch 102. A logic zero is provided to a true (T) input of the switch 102.

The switch 102 is enabled by a signal (SW2) on a line 106 from the CLP logic 94 which checks for a value of CLP greater than a threshold, according to the following equation:

$$\text{IF } CLP>ACLP \text{ THEN } SW2=0 \text{ ELSE } SW2=1 \quad (5)$$

Thus, if the value of CLP commanded by the pilot exceeds the threshold (ACLP), the switch passes the schedule output to the summing junction 88. If CLP is below the threshold, the switch passes the logic zero on the T input to the summing junction 88. The output of the summing junction 88, which is provided on a line 110 to an F input of the switch 78, is indicative of autorotation recovery total NG rate request (% NG/SEC) as a function of NR rate of change, and, if CLP exceeds the threshold, as a function of CLP rate of change.

If SWATOR equals zero (when the AEL 52 detects an autorotation), the signal on the line 110 is passed to the switch output on a line 112 and to the input of the integrator 80. In accordance with the present invention, the integrator integrates the rate-based recovery information with respect to time until the AEL and switch logic determine that the autorotation recovery is complete (SWATOR=1). Recovery is complete when the rotor deceleration (DNRFB) is in excess of a predetermined threshold (ADNR), which, in practice, is nearly zero. The integrator output signal (BIAS) on a line 114 is a time composite of the recovery NG rate request (% NG) and is provided to a summing junction 116.

Also input to the summing junction 116 is a reference NG signal (NGCLPR) on a line 118 from a schedule 120 of NG versus CLP, along with an output on a line 122 from a summing junction 124. One input to the summing junction 124 is a signal (NFTRIM) on a line 125 indicative of pilot-desired NF trim. A second input is a signal on a line 126 indicative of 100% rated speed from a reference source 128. A third input is the measured NF speed signal on one of the lines 46. The summing junction 124 provides an output signal (NFERR) on the line 122 indicative of NF speed error.

The summing junction 116 sums the three signals, BIAS, NGCLPR, and NFERR, and provides an NG reference signal (NGREF) indicative of commanded NG on a line 130 to a summing junction 132, which subtracts measured NG on a line 134 therefrom and provides a signal indicative of NG error on a line 136 to known gas generator control logic 138. Thus, the signal BIAS from the integrator output, in accordance with the present invention, increases the commanded NG reference on the line 130, which has the effect of calling for an increased fuel flow to the gas generator 30 in anticipation of rotor reengagement.

NG is provided by a speed sensor 140 responsive to the speed of the gas generator 30. The gas generator control logic 138 provides a signal on a line 142 indicative of a commanded stepper motor rate request to a known electromechanical stepper motor 144. The motor controls a fuel metering unit (FMU) 146 which meters fuel from a fuel pump 148 to the engine burner 36 over the fuel lines 38.

As is known in the prior art, signals NFERR and NGCLPR are summed and the sum provided as an NG reference signal to be compared to actual NG, any difference therebetween being indicative of NG error to which the gas generator control 138 is responsive in commanding a correct fuel flow to the engine. All of the foregoing may be termed as the main control portion of the fuel control 40. Thus, one aspect of the present invention is in the provision to the main control portion of an integrated time-composite signal indicative of the desired recovery anticipation. This improves the sensitivity of the fuel control to the recovery process as compared to typical implementations, e.g., Howlett et al U.S. Pat. No. 4,466,526 which act on the instantaneous recovery anticipation.

However, application of recovery anticipation to the main control portion requires a form of controlled removal in order to prevent secondary transients from being induced therein. This controlled removal is provided for, in accordance with a further aspect of the present invention, by transforming the integrator into a lag function when the rotor speed deceleration drops near zero; i.e., when the recovery is complete as determined by the AEL 52 and switch logic 74.

The lag function is accomplished by presenting the integrator output on the line 114 to an input of a multiplier 160, whose output on a line 162 is applied to the T input of the switch 78. The switch passes the multiplier output to the integrator 80 when SWATOR=1, i.e., when the rotor deceleration rate approaches zero (equation (4) above).

A second input to the multiplier 160 is provided on a line 164 from a schedule 166 of integrator feedback gain versus rotor speed error. The schedule input is the output on a line 168 from a summing junction 170, whose inputs are the measured rotor speed, NR, on the line 62 and the output of NFREF logic 174 on a line 176. The NFREF logic 174 integrates the pilot-desired NFTRIM signal on the line 125 to provide the NFREF signal on the line 176 and sums it with a constant nominal NF reference value. The summing junction 170 differences the two inputs and provides a signal indicative of rotor speed error on the line 168 to the schedule 166.

Thus, the amount of integrator output signal fed back to the integrator input is controlled by the amount of rotor speed error, which is indicative of autorotation recovery error. In this way, the amount of bias provided to the main control portion is proportional to the recovery error, thereby providing a controlled removal of the bias in a manner which reduces secondary transients induced in the fuel control.

In sum, the two aspects of the present invention provide the means for the separate build-up and removal of the recovery bias to the main control portion of the fuel control. In practice, this has provided for a flexible system response.

It is to be understood that the specific means described herein of autorotation detection is exemplary; any suitable means may be used, e.g., by simply comparing NF to NR when Q is unavailable, or by a combination of Q and NR, or simply Q itself. It suffice for the present invention that the presence or absence of autorotation be detected and a signal indicative thereof be provided.

Also, the rate-based recovery information fed to the integrator is exemplary. Recovery information based in part on CLP is described due to the fact that CLP represents the main power setting to which the fuel control is responsive to in controlling fuel to the engine. However, recovery information based solely on rotor speed rate of change may be used if desired, or other recovery information may be integrated, the selection of which should be readily apparent to one of ordinary skill in the art. It suffice for the present invention that any suitable rate-based recovery information be provided to an integrator.

The exemplary embodiment of the invention is described with respect to a particular rotorcraft gas turbine engine. However, the present invention may be utilized on other types of gas turbine turbine engines, if desired, which find applications outside of rotorcraft, e.g., marine. It suffice that the present invention be practiced where the engine output shaft is normally declutched from the load upon autorotation.

The invention is illustrated in analog form. However, these functions may be performed using software program steps, analogous to the analog functions described herein, in a suitable digital control computer, e.g., a Model EEC139 flight control manufactured by Hamilton Standard. Furthermore, the invention may be implemented with any suitable mix of dedicated analog and digital hardware, if desired, in an appropriate fashion which should be readily apparent to those skilled in the art in light of the description herein. All of the foregoing changes and variations are irrelevant; it suffice that autorotation be detected, and rate-based recovery information be provided to an integrator which provides a time composite signal indicative thereof to the main control portion of a gas turbine engine control. Further, the integrator output bias signal is reduced in proportion to the recovery error.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A control for a helicopter gas turbine engine having a free turbine with an output shaft for driving a rotor mechanically coupled thereto and having a gas generator for driving the free turbine, comprising:
   rotor speed means, for providing a rotor speed signal indicative of the actual rotary speed of the rotor;
   gas generator speed means, for providing an actual gas generator speed signal indicative of the actual rotary speed of the gas generator;
   engine control means, for providing an autorotation signal indicative of the mechanical coupling state between the rotor and the free turbine output shaft, for providing, in response to said rotor speed signal, a rotor deceleration signal indicative of the deceleration of said rotor, for providing a desired gas generator speed rate of change signal indicative of a desired gas generator speed rate of change during a recovery from autorotation, for providing a desired gas generator speed signal indicative of a desired gas generator speed, and for providing a fuel command signal in response to said actual gas generator speed signal and said desired gas generator speed signal; and
   fuel metering means, for metering fuel to the gas generator at a flow rate determined in response to said fuel command signal; characterized by:

said engine control means comprising means for integrating said desired gas generator speed rate of change signal in response to said autorotation signal being indicative of the rotor being mechanically decoupled from the free turbine output shaft, for providing an integrated recovery signal indicative thereof, and for providing said desired gas generator speed signal with a fuel increasing component as a function of said integrated recovery signal and in the presence of said autorotation signal being indicative of the rotor being mechanically decoupled from the free turbine output shaft and continuing until said rotor deceleration signal is nearly zero.

2. The control of claim 1, further comprising:

turbine speed means, for providing an actual turbine speed signal indicative of the actual rotary speed of the free turbine; and torque means, for providing a torque signal indicative of the torque on the output shaft.

3. The control of claim 2, wherein said engine control means further comprises means for determining the mechanical coupling state between the rotor and free turbine output shaft in response to said actual turbine speed signal, said torque signal and said rotor speed signal, and for providing said autorotation signal indicative thereof.

4. The control of claim 3, wherein said engine control means comprises means for determining a mechanical decoupled state between the rotor and free turbine shaft upon a predetermined difference between said actual turbine speed signal and said rotor speed signal, said predetermined difference occurring for a predetermined length of time concurrently with the value of said torque signal being below a predetermined threshold, and for providing said autorotation signal indicative thereof.

5. The control of claim 2, wherein said engine control means further comprises means for determining the mechanical coupling state between the rotor and free turbine output shaft in response to said actual turbine speed signal and said rotor speed signal, and for providing said autorotation signal indicative thereof.

6. The control of claim 5, wherein said engine control means comprises means for determining a mechanical decoupled state between the rotor and free turbine output shaft upon a predetermined difference between said actual turbine speed signal and said rotor speed signal, and for providing said autorotation signal indicative thereof.

7. The control of claim 1, wherein said engine control means further comprises means for providing said desired gas generator speed rate of change signal as a function of said rotor speed signal.

8. The control of claim 1, wherein said engine control means further comprises means for providing a collective signal indicative of a desired angle of the blades of the helicopter rotor.

9. The control of claim 8, wherein said engine control means further comprises means for providing said desired gas generator speed rate of change signal as a function of said collective signal.

10. The control of claim 8, wherein said engine control means further comprises means for providing said desired gas generator speed rate of change signal as a sum of a function of said collective signal and a function of said rotor speed signal.

11. The control of claim 8, wherein said engine control means further comprises means for providing said desired gas generator speed rate of change signal as a sum of a function of said collective signal and a function of said rotor speed signal when said collective signal exceeds a predetermined threshold.

12. The control of claim 1, wherein said engine control means comprises means for providing said fuel command signal as a function of the difference between said actual gas generator speed signal and said desired gas generator speed signal.

13. The control of claim 1, wherein said engine control means further comprises means for providing a desired turbine speed signal indicative of a function of a desired free turbine rotary speed.

14. The control of claim 13, wherein said engine control means further comprises means for providing a rotor speed error signal as a function of said desired turbine speed signal and said rotor speed signal.

15. The control of claim 13, wherein said engine control means further comprises means for providing a rotor speed error signal as a function of the difference between said desired turbine speed signal and said rotor speed signal.

16. The control of claim 15, wherein said engine control means further Comprises means for multiplying said integrated recovery signal with said rotor speed error signal, and for providing a multiplied error signal indicative of the product thereof.

17. The control of claim 16, wherein said engine control means further comprises means for integrating said multiplied error signal in response to said autorotation signal being indicative of the rotor being mechanically coupled to the free turbine output shaft, for providing said integrated recovery signal indicative thereof, and for providing said desired gas generator speed signal with a fuel increasing component in response to said integrated recovery signal and in the presence of said autorotation signal being indicative of the rotor being mechanically coupled to the free turbine output shaft.

* * * * *